July 19, 1955

R. M. SMITH 2,713,622

CIRCUIT RECLOSER

Filed Dec. 14, 1950

6 Sheets-Sheet 1

INVENTOR.

ROY M. SMITH

BY

Ostrolenk & Faber

ATTORNEYS

INVENTOR.
ROY M. SMITH

BY
Ostrolenk & Faber
ATTORNEYS

July 19, 1955 R. M. SMITH 2,713,622

CIRCUIT RECLOSER

Filed Dec. 14, 1950

6 Sheets-Sheet 3

INVENTOR.
ROY M. SMITH

BY Ostrolenk & Faber
ATTORNEYS

July 19, 1955

R. M. SMITH

CIRCUIT RECLOSER 2,713,622

Filed Dec. 14, 1950

6 Sheets-Sheet 4

INVENTOR.
ROY M. SMITH

BY
Ostrolenk & Faber
ATTORNEYS

July 19, 1955
R. M. SMITH
2,713,622
CIRCUIT RECLOSER
Filed Dec. 14, 1950
6 Sheets-Sheet 5
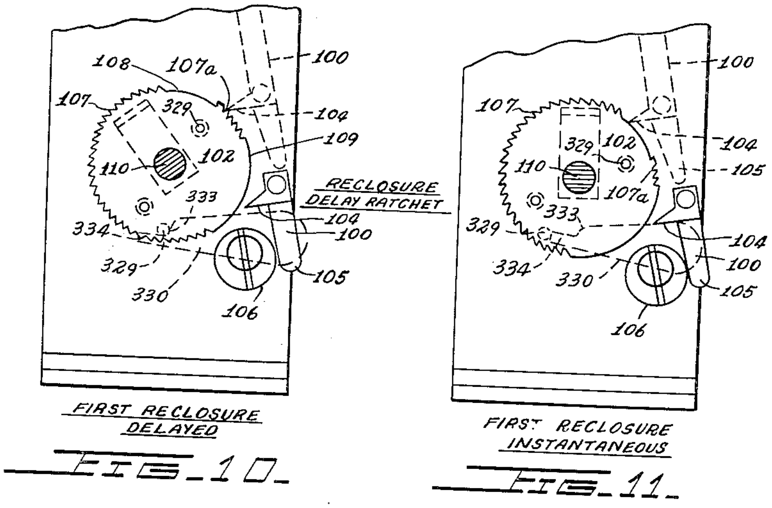
FIRST RECLOSURE DELAYED
FIG. 10
FIRST RECLOSURE INSTANTANEOUS
FIG. 11
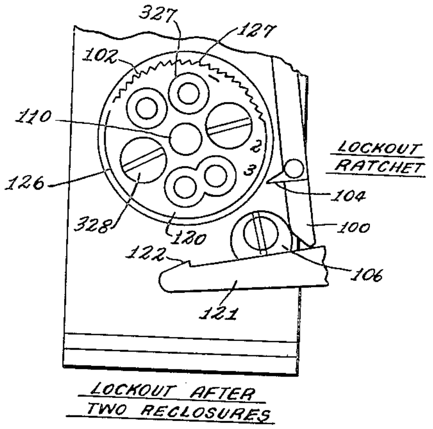
LOCKOUT AFTER TWO RECLOSURES
FIG. 12
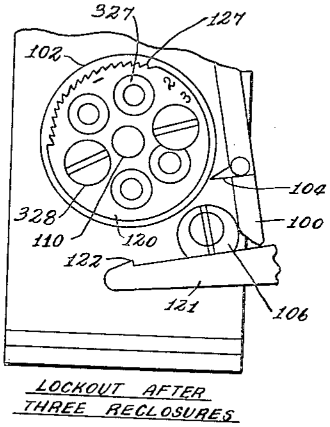
LOCKOUT AFTER THREE RECLOSURES
FIG. 13
INVENTOR.
Roy M. Smith
BY
Ostrolenk & Faber
ATTORNEYS

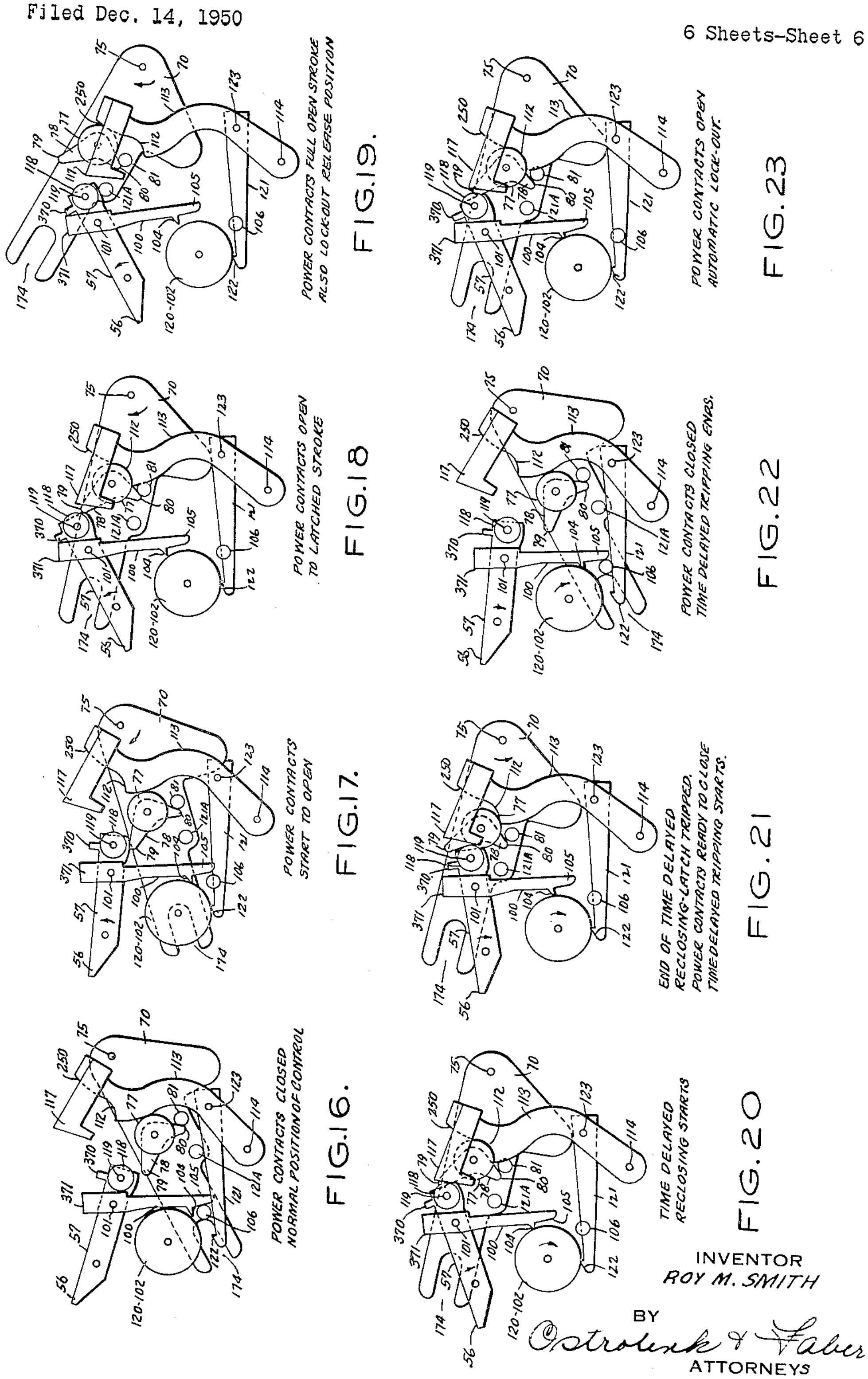

FIG.16. FIG.17. FIG.18 FIG.19. FIG.20 FIG.21 FIG.22 FIG.23

FIG.16. POWER CONTACTS CLOSED NORMAL POSITION OF CONTROL

FIG.17. POWER CONTACTS START TO OPEN

FIG.18 POWER CONTACTS OPEN TO LATCHED STROKE

FIG.19. POWER CONTACTS FULL OPEN STROKE ALSO LOCK-OUT RELEASE POSITION

FIG.20 TIME DELAYED RECLOSING STARTS

FIG.21 END OF TIME DELAYED RECLOSING-LATCH TRIPPED. POWER CONTACTS READY TO CLOSE TIME DELAYED TRIPPING STARTS.

FIG.22 POWER CONTACTS CLOSED TIME DELAYED TRIPPING ENDS.

FIG.23 POWER CONTACTS OPEN AUTOMATIC LOCK-OUT.

INVENTOR
ROY M. SMITH
BY
Ostrolenk & Faber
ATTORNEYS 2,713,622

CIRCUIT RECLOSER

Roy M. Smith, Jeannette, Pa., assignor, by mesne assignments, to I-T-E Circuit Breaker Company, Philadelphia, Pa., a corporation of Pennsylvania Application December 14, 1950, Serial No. 200,781

8 Claims. (Cl. 200—89)

My present invention relates to automatic reclosers, that is, the type of electrical switchgear arranged to open and reclose a number of times on fault current and to lock open after a predetermined number of openings within a limited period of time.

More particularly, my invention is an improvement on the structure shown in Patents Nos. 2,118,355; 2,167,665; Re. 22,872; and 2,443,260 and is especially an improvement on the structure shown in application Serial No. 113,371 filed August 31, 1949.

One of the main functions of a good modern alternating current oil circuit recloser is the protection it gives to fuses located out on the distribution circuit beyond the recloser. That is, the first or instantaneous trip of the recloser must be so fast that it will open the circuit in case of a fault before the fuses adjacent to the short circuit have time to operate or even be damaged. This requires a very fast operation of the recloser on its first tripping function so that the circuit can be very quickly opened and thus prevent the damaging or blowing of the fuses which should clear for that particular fault.

Upon reclosing the circuit, if the fault still exists, then the recloser is purposely delayed in its tripping function in order to allow the short circuit current to blow the proper fuse and thus isolate a faulty section of line from the remaining part of the distribution circuit. Usually the recloser itself is also backed up or protected by some other piece of heavy-duty switchgear equipment, such as a station circuit breaker, which has large interrupting ability.

This back-up protection ordinarily does not have to function for faults beyond the recloser since it will operate one or more times and isolate the faulty part of the line if the proper fuses do not blow or if a fault is located adjacent to the recloser with no fuses between.

It is well known to those skilled in the art that an oil circuit recloser, circuit breaker, or other similar piece of protective equipment has considerably more interrupting capacity on its first opening than it has on subsequent openings, spaced at short time intervals.

This is because of the relatively favorable conditions existing before the first opening, such as clean, clear oil surrounding the interrupting contacts, no gas or air in the vicinity of the contacts, and contacts and current carrying parts at normal operating temperatures.

If the recloser opens once and then recloses on a short circuit, the conditions are no longer ideal for opening the circuit. The contacts and current carrying parts may be quite hot and therefore more easily damaged by the second opening, the oil surrounding the contacts will no longer be clean and cool, and gas or vapor bubbles may surround the interrupting contacts along with carbon particles and other products of combustion.

For these and other reasons, it is well known that a recloser must be derated if it is allowed to complete its complete duty cycle, such as three or four interrupting operations, followed in close order, without sufficient time being allowed for the dissipation of the arc products.

Since there are many applications where the very high interrupting capacity is desirable and required to protect the lines and fuses located beyond the recloser, it might be desirable to take advantage of the larger interrupting capacity on the first or instantaneous trip and forego the operation of the recloser on the subsequent or time delay trips for all short circuit currents above the reduced rating of the recloser on these time delay trips.

An object of my invention, therefore, is to use a small auxiliary relay with its current coil connected either in series with the control coil or in parallel with the control coil of an automatic recloser of the type shown in the above mentioned application.

This relay will have an armature which can be adjusted to pick up at and above any predetermined current magnitude in the circuit. At currents above the pick-up value, the armature will move to the operated position and a detent on the armature will drop into a suitable slot on the fly-wheel or pendulum of the timer preventing its operation or into engagement with a suitable position of the control coil armature. With this action the recloser will be held inoperative to reopen until the short circuit current disappears (as by the opening of a suitable back-up oil circuit recloser or a circuit breaker).

In the case of the automatic recloser of the above application, the operation on a very large short circuit would be as follows. The recloser would operate instantly since the recloser is so designed that there is no intentional time delay on the first tripping stroke. The main contacts would open and then, after the usual short time delay, the main contacts would reclose.

In the meantime, the timer arm would be raised up to its upward location and the pawl would engage with one of the teeth on the time delay ratchet. This action would tend to cause the timer to operate under the influence of the timer spring acting on the timer arm.

However, on currents above the setting of the overcurrent relay, the detent would block the escapement by stopping the pendulum or fly-wheel and the recloser would remain in that condition as long as the excess short circuit current existed. That is, the main contacts would be closed and the control contacts would be blocked in the closed or shorting position. As soon as the short circuit current was interrupted, the overcurrent relay would reset and remove the detent from the fly-wheel, thus allowing the timer to complete its operation, removing the opening latch from under the toggle linkage. This action would return the recloser to its normal reset position ready to operate on subsequent faults.

Thus, a primary object of my invention is the provision of means to block a second opening of an automatic recloser on a current value more than the normal operating value of an automatic recloser.

Another object of my invention is to use a large auxiliary electromagnet with its current coil connected either in series or parallel with the central coil of an automatic recloser.

This electromagnet will have an armature which can be adjusted to pick up at and above an overcurrent value of a predetermined minimum intensity. At currents above pick-up value, the armature will be attracted to a position where it is capable of preventing a toggle linkage and subsequently the recloser contacts from opening. As is well known in the mechanical arts, the force multiplying feature of the toggle linkage will require a small holding force from the auxiliary elecctromagnet as compared to the force of the control magnet which is attempting to open this member.

The auxiliary electromagnet is so constructed that its armature has a larger inherent time delay than the armature of the control magnet. In the application Serial No. 113,371 filed August 31, 1949, the recloser is designed to have an initial opening with no intentional time delay. As a result of the inherent time delay lag of the auxiliary armature of my present invention, the initial opening and reclosing will occur with no intentional time lag. However, since the inherent time delay of the auxiliary armature is less than the time delay of the second opening, the auxiliary magnet will be effective in blocking the toggle linkage to prevent contact separation during the existence of rated fault current.

The foregoing and many other objects of my invention will become apparent in the following description and drawings in which:

Figures 10 and 11 illustrate schematically the operation of the time delay ratchet.

Figures 12 and 13 illustrate schematically the operation of the lock-out ratchet.

Figures 16 to 23 are schematic views showing the successive positions of the latching mechanism in association with the timer mechanism. Figures 16 to 19 are relative to opening operation of the contacts, whereas Figures 20 to 22 are descriptive of reclosing and time delayed opening operations. Figure 23 schematically shows the position of these control elements in the lock-out condition after a specific number of openings and reclosures have occurred. Figure 19 is also descriptive of the position of the latches and associated mechanism for release after lock-out to permit reclosure.

Figures 1, 2:
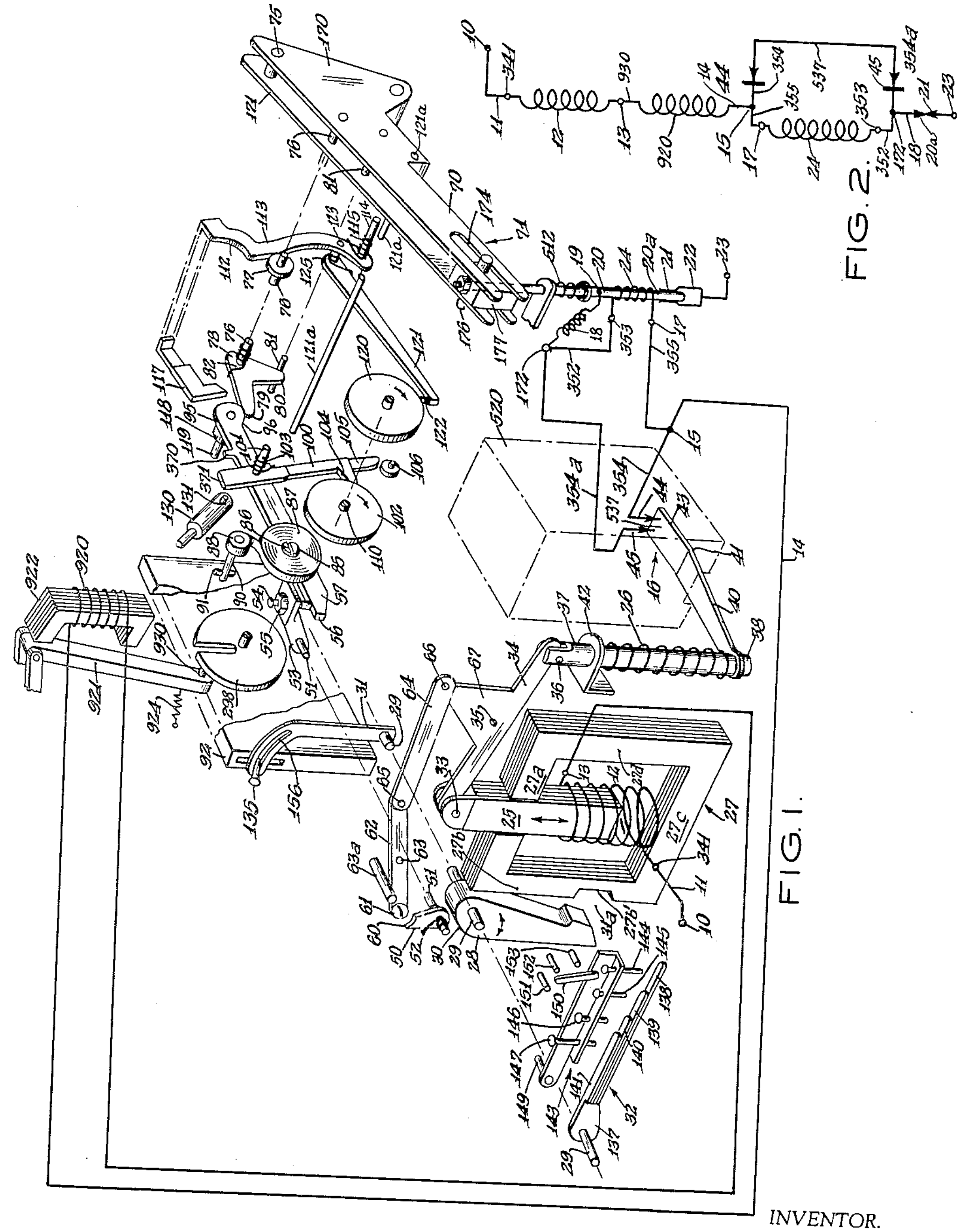
Figure 1 is a schematic view of an automatic recloser incorporating a preferred method of applying the auxiliary relay to restrain the timing device.
Figure 2 is a circuit diagram of the operation of Figure 1.

Referring to the figures, the operating mechanism which controls the opening movement and also time delays the reclosure and which mechanically defeats the closing spring after a predetermined number of reclosures is all shown schematically in Figure 1.

During normal operations, the electrical elements of the recloser are connected in series with the power line at terminals 10, 23 which are to be protected by the recloser. This circuit extends from terminal 10, conductor 11, connector 341, through winding 12 of the control magnet, terminal 13, conductor 930, through the coil 920 of the auxiliary electromagnet 922, connector 15, contacts 44 and 45 bridged by switch operating member 43, conductor 354A to terminal 172 and pigtail 18, to terminal 19 and through rod 20 to stationary contact 20A, contact 21 to the power line terminal 23.

As noted in Figure 1, the electromagnet 922 energized by coil 920 is arranged to attract the armature 921 which is biased by a calibrated spring 924 or in any other appropriate manner so that the armature 921 can be attracted only on the occurrence of an overload condition of predetermined minimum intensity; in this case, an overload condition equal to the initial maximum intensity capacity of the recloser.

It will be noted that with contact 43 bridging the contacts 44, 45, the winding of operating magnet 24 is by-passed so that normally substantially no current flows through and therefore there is substantially no loss due to current flowing in this winding. However, the windings of control magnet 12 are connected in series with the power line and are therefore energized by line current. On predetermined energization of the control magnet 12, in response to a fault current in the power line, lever 40 which carries contact 43 is moved, as will hereinafter be described, to open the bridge across contacts 44, 45, thereby inserting the winding of operating magnet 24 in series with the winding of control magnet 12 and the power line. Magnet 24 is now energized in response to the fault current to operate its rod 20 to contact disengaged position.

Following separation of the main contacts 21 and 20A, the arc which is formed on the opening of the circuit at that point is extinguished and results in de-energization of the operating coil 24. Thereupon the closing spring hereinafter described drives the plunger 20 down to reestablish current carrying connections between the main movable contact 20A and the main stationary contact 21.

The operating mechanism shown schematically in Figure 1 is designed to provide appropriate controls for circuit opening operations and for the reclosing operations, so that successive reclosing operations may take place with a desired time delay interval between them and so that the plunger 20 may be locked in the up or disengaged position after a predetermined number of reclosing operations.

The control coil 12 is arranged so that in response to a fault current of predetermined value in the circuit which is protected control coil 12 will be sufficiently energized to move solenoid armature 25 connected to the control switch 16 and thus to open the control switch.

The control coil 12, therefore, is the initial operating coil of the entire system. Control coil 12 is essentially a solenoid coil surrounding the armature 25 which is normally biased above the coil by compression spring 26 in the manner hereinafter described.

The armature 25 is preferably a laminated iron structure, a portion of which forms, together with the laminated magnetic rectangular plates 27*a* and 27*b* and with 27*d* and 27*c*, magnetic paths for the flow of flux in response to energization of the control coil 12.

The magnetic path 27 includes the additional armature 28 which is secured to the rotatable shaft 29 so that portion 30 thereof is in engagement with the top leg 27*b* of the magnetic flux path.

For ordinary current values flowing through control coil 12, magnetic flux through the legs 27*a*, 27*b*, 27*d* and 27*c* of the magnet is not sufficient to attract the armature 28.

However, where a predetermined current value is exceeded, i. e., a fault current flows in the line, section 27*b*′ of the leg 27*b* of the magnet becomes saturated and the resultant magnetic flux passing from leg 27*b* through the armature 28 and across the air gap 31*a* results in attraction of the armature 28 toward the magnet 27. This results in rotation of the shaft 29 and the curved timer adjustment fork 31 mounted on shaft 29.

Thus, the control coil 12 has two immediate functions when energized to a predetermined value in excess of normal current value: (1) it attracts the armature 25 against the bias of compression spring 26 and (2) it attracts the armature 28 against the bias of the spring assembly 32 of armature 28, which spring assembly is also hereinafter described.

The upper end of armature 25 is connected by pin 33 to the lever 34 which is pivotally mounted on the stationary pivot 35. The opposite end of the lever 34 is connected by pivot 36 to the connecting rod 37. The lower end of connecting rod 37 is connected by pin 38 to the control switch operating lever 40.

Control switch operating lever 40 is pivotally mounted on the pivot 41. Compression spring 26 compressed between the stationary collar 42 and the end of lever 40 at pivot 38 surrounds the connecting rod 37.

Figures 8, 9, 14, 15:
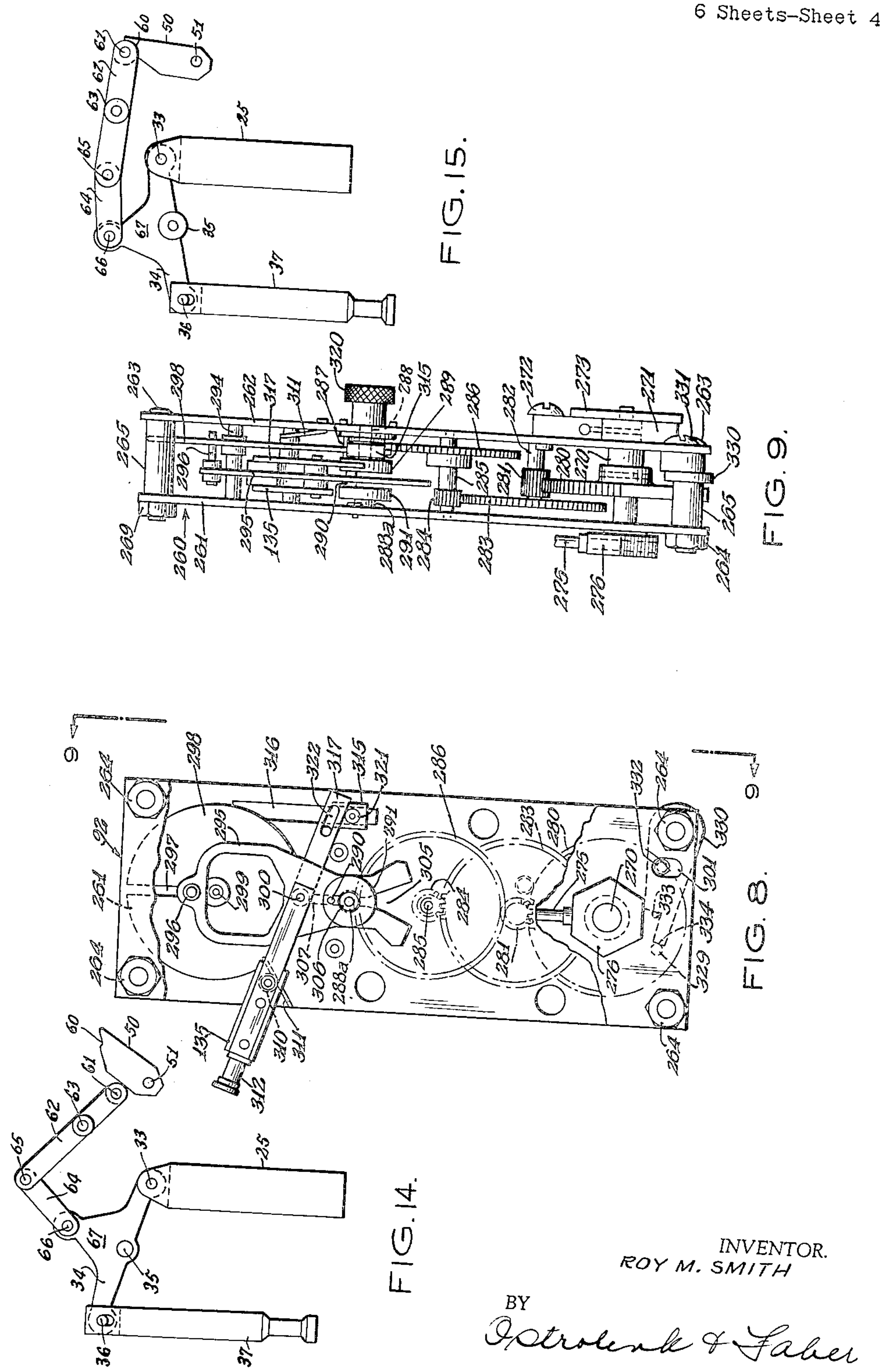
Figure 8 is a side view with a part of the center removed of the timing mechanism for use in connection with the control elements of my novel automatic circuit recloser.
Figure 9 is a view of the timing mechanism of Figure 8 taken from line 9—9 of Figure 8.
Figure 14 is a schematic view corresponding to that of Figure 15 but showing the trip position of the control coil.
Figure 15 is a view on the opposite side of the control coil and its associated armatures.

Compression spring 26 drives the lower end of connecting rod 37 and therefore the left-hand end of control switch lever 40 downwardly, thereby pulling down the right-hand end of lever 34, lifting up the left-hand end of lever 34 and exerting an upward initial bias on pin 33 and armature 25. Spring 26 by this means normally maintains the armature 25 in the raised position partly outside of the control coil 12 as shown in Figures 1 and 15.

The right-hand end of the control switch lever 40 is provided with the contact section 43 normally bridging the stationary contacts 44, 45 of the control switch 16 and being held in bridging engagement therewith by the compression spring 26 which drives the left-hand end of lever 40 down as previously described.

On energization of control coil 12 to a sufficient value, armature 25 is moved, rotating lever 34 in a counterclockwise direction around pivot 35 and raising the connecting rod 37 upwardly against the bias of compression spring 26.

This results in a clockwise rotation of lever 40 and the movement of the bridging contact 43 away from the stationary contacts 44 and 45 of the control switch 16.

Accordingly, the current value at which the control coil 12 will be energized sufficiently to attract the armature 25 may be determined by the compression of compression spring 26 and may if desired (but not preferably) be calibrated by making collar 42 adjustable.

The "drop out" characteristic of the control relay is important. It is desirable for reclosers to have this feature in order to protect the normally shunted operating coil from carrying load currents which would burn them out. In case that a fault clears from a line (such as by self-clearing or by the blowing of a distribution transformer primary fuse) before the power contacts have had time to open but after the control contacts have opened, the load current returns to normal.

Unless a high "drop out" value is afforded, the control armature stays in the fully attracted position by the load current, thereby holding the control contacts open. This causes the load current to pass through the operating coil which is normally shunted. The drop out value should be at least 80% of the full load rating. The present recloser provides suitable drop out by including a non-magnetic plate which prevents the armature from sealing in against the magnetic pole face.

However, a simpler and more accurate degree of adjustment is provided by the opening latch 50 keyed to and mounted on the rotatable pin 51, the opening latch 50 being spring biased in a clockwise direction with respect to Figure 1 toward latching position by the coil spring 52.

Pin or shaft 51 carries the lug 53 secured thereto and rotatable therewith, which lug carries at its outer end the pick-up calibrating screw 54 which is adjustably mounted in the lug 53 for upward and downward movement on rotation of the screw 54 and which may be locked in the adjusted position by the lock nut 55.

The lower end of the pick-up calibrating screw 54 bears against the forward end 56 of the timer arm 57. The opening latch 50 is provided with the latching detent 60 so arranged that it provides a detent or ledge against which the roller 61 at the end of lever 62 may bear.

Lever 62 is pivotally mounted on the stationary pin 63. The end thereof opposite the roller 61 is in toggle relation with the link 64, being connected thereto by the knee pin 65. The opposite end of toggle 62—65—64 is connected by pin 66 to the upwardly extending arm 67 of the lever 34.

When, therefore, the armature 25 is attracted downwardly by energization of the control coil 12 to rotate the lever 34 in a counterclockwise direction, it not only must compress the spring 26 but also must operate against the holding force of the latch 50 so that the toggle 62—65—64 may collapse.

The armature 25, therefore, cannot be pulled down by coil 12 unless the roller 61 bearing against the latching detent 60 displaces the opening latch 50 in a counterclockwise direction with respect to Figure 1 or in a clockwise direction with respect to Figure 14.

The pick-up calibrating screw 54 bearing against the forward end 56 of the timer arm 57 determined the angular position of the pin 51 and the opening latch 50 thereby determining the degree to which the latching detent 60 of the opening latch 50 underlies the roller 61 at the end of toggle 62—65—64. Pin 63A bearing on the top surface of lever 62 ensures that roller 61 will ride in latching detent 60.

The degree to which the detent 60 underlies the roller 61 determines the initial force required to displace the opening latch 50 in order to permit the armature 25 to be moved down by coil 12. The greater the displacement of the opening latch 50 in a counterclockwise direction (with respect to Figure 1) the less force required to push the roller 61 off the latching detent 60 to rotate the opening latch 50 from the position of Figure 15 to the position of Figure 14.

The greater the adjustment of the latch 50 in a counterclockwise direction with respect to Figures 14 and 15, the greater the force required for this displacement.

Accordingly, the adjustment of pick-up calibrating screw 54 which determines this initial angular displacement of the opening latch 50 determines the force and hence the overcurrent condition required before initiation of operation of the apparatus.

When, however, this displacing force is reached, armature 25 is pulled down by control coil 12; roller 61 of toggle 62—65—64 rolls off the latching detent 60 and against the side of the opening latch 50; the opening latch 50 is rotated in a clockwise direction while toggle 62—65—64 collapses, as noted in Figure 14; the connecting rod 37 is raised; switch operating lever 40 is rotated, and bridging contact 43 moves out of engagement with the stationary contacts 44 and 45 of the control switch 16.

With the control switch 16 thus opened, the full current passes through the operating coil 24 which attracts the plunger 20, pulling it upwardly and separating the main movable contact 20A from the main stationary contact 21 to open the circuit.

The upper end of the plunger 20 is connected to the operating arm 70 by the yoke connection 71 in such manner that the upward movement of plunger 20 must necessarily result in upward rotation of operating arm 70 and downward movement of the plunger 20 must necessarily result in downward rotation of the operating arm 70 and vice versa since operating arm 70 is rotatably mounted on the stationary pivot 75 at the end opposite its connection at 71 to plunger 20.

Operating arm 70 carries intermediate its ends and extending transversely with respect thereto the pin 76 on which are rotatably mounted the main latch roller 77 and the pawl 78. Pawl 78 is essentially a bell crank lever in form having a timer arm engaging leg 79 for engagement with arm 57 in the manner hereinafter described and a downwardly extending positioning leg 80.

In the normal at rest position of the operating arm 70, the positioning leg 80 of pawl 78 is driven by coil spring 82 against the stop pin 81 carried by the operating arm 70.

The timer arm 57, as is shown in Figure 1, is provided with a slotted pin 85 receiving the end 86 of coil spring 87. Coil spring 87 is wound around the slotted pin 85 and the outer end 88 thereof is connected to the stationary pin 90 carried in the lug 91 extending from the side of the timing mechanism housing 92.

Coil spring 87 is so adjusted that the timer arm 57 in the normal closed circuit position of the apparatus is substantially horizontal. When the timer arm 57 is rotated in a counterclockwise direction with respect to Figures 1 and 16, the coil spring 87 is tensioned tending to rotate the timer arm 57 back toward the substantially horizontal position.

Timer arm 57 has a rearward extension 95 with a rounded undersurface 96 which will be engaged by the upper surface of leg 79 of pawl 78 when the operating arm 70 begins to rise (compare Figures 16 and 17) during the upward movement of the plunger 20.

Thus, as the operating arm 70 rises, the pawl 78 lifts the rear end 95 of the timer arm 57 rotating the timer arm as above described and thereby lifting the time delay pawl lever 100 which is connected by the pin 101 to the timer arm 57 between the pin 85 and the end 95 of the timer arm 57.

Time delay pawl lever 100 is biased in a clockwise direction toward the time delay toothed ratchet 102 by the coil spring 103. Time delay pawl lever 100 is provided with the pawl tooth 104 which bears against the time delay circular ratchet 102.

Lever 100 also is provided with the extension 105 below the pawl tooth 104 having a cammed surface which bears against the pin 106 carried by the housing 92 of the timer mechanism and which in the normal at rest position of the operating mechanism with the switch contacts closed maintains the pawl tooth 104 out of engagement with the surface of the time delay ratchet 102, as shown in Figure 16.

Pin 106 is rotatable and is cam shaped to provide adjustment of the disengaging point of pawl 100.

When, however, the operating arm 70 is raised about its pivot 75 owing to the lifting up of the plunger 20 by the operating solenoid coil 24 and pawl 78 thus lifts the end 95 of the timer arm 57, the time delay pawl lever 100 is lifted; and as soon as its extension 105 clears the pin 106, coil spring 103 drives the pawl tooth 104 against the surface of the time delay ratchet 102. This is shown diagrammatically by a comparison of Figures 17 and 18.

The pawl tooth 104 of the time delay pawl lever 100 rides up the surface of the time delay ratchet 102 without rotating the same owing to the curvature of the teeth 107 of the ratchet 102 (see also Figures 10 and 11) and also owing to the fact that certain portions 108, 109 may be made smooth and without the teeth 107 for purposes hereinafter more specifically described.

From the description thus far it will be apparent that in response to a predetermined fault current, control magnet 12 was energized, opening the shunt switch around operating magnet 24. Magnet 24 was then energized in response to the fault current and the circuit breaker contacts opened instantaneously. The contacts are latched in open position, as will hereinafter be described. At the same time energy was stored in a spring 512 which, now under control of a time delay mechanism, is tending to bias the contacts against the principal latch.

Contacts 20A, 21 are opened in an arc chamber in which the resultant arc following circuit interruption is extinguished. The operating magnet 24 is de-energized and the plunger 20 is now operable under action of a biasing spring 512 to reclose contacts 20A and 21 as soon as the time delay releases the latch.

The ratchet 102 is keyed to the timer shaft 110 which is under the control of the timing mechanism within the timing mechanism housing 92. Assuming that the first reclosure is to be delayed, then the teeth 107*a* (Figure 10) of ratchet 102 are so positioned, also in a manner hereinafter described, that the pawl tooth 104 will engage the teeth 107*a* at the upper limit of movement of the timer arm 57, lever 100 and pawl tooth 104, as shown in Figure 20.

Timer arm 57 is held up by pin 121*a* when the recloser is in fully open position. Figure 19 shows the fully open position before reclosure starts.

At this time the leg 79 of pawl 78 has been moved through a sufficient arc by rotation on pin 76 to disengage the curved undersurface 96 of the rear extension 95 of the timer arm 57 and the end 95 of the timer arm 57 is released to move downward and hence the time delay pawl lever 100 begins to descend, as indicated in Figure 20.

This descent is, however, delayed by the timing mechanism 260 in timing mechanism housing 92 which controls the rotation of shaft 110 and timing arm 57 cannot move instantaneously back to its original position under the influence of coil spring 87 but returns with a timed movement determined by the speed at which the timing mechanism in housing 92 permits the pawl tooth 104 to drive the time delay ratchet 102.

The main latch roller 77 seats in the latching detent 112 just prior to the disengagement of pawl end 78 from timer arm end 96. The principal latch 113 constitutes a lever arm pivotally mounted on the stationary pin 114 and biased toward the main latch roller 77 by the coil spring 115.

When the main latch roller 77 carried by the operating arm 70 which is connected at 71 to the plunger 20, therefore, seats in the latching detent 112, the operating arm 70 and the connected plunger 20 are locked in the up position, as shown in Figure 21. This latching operation is accomplished by making the up stroke of plunger 20 and arm 70 sufficient to lift latch roller 77 above latching detent 112 high enough to ensure that pawl 78 will disengage the timer arm 57. Latch roller 77 then moves down slightly with arm 70 and plunger 20 to rest on detent 112.

As previously pointed out, a compression spring 512 hereinafter described has been compressed by the upward movement of plunger 20 to bias the plunger 20 downwardly to the position in which contacts 21 and 22 will engage. This compression spring is, however, defeated by the interengagement of the main latch roller 77 with the latching detent 112 of the principal latch 113.

The principal latch 113 has a U-shaped extension 117 arranged in the path of movement of roller 118 carried on pin 119 at the rear end 95 of the timer arm 57, as shown in Figure 1.

As the timer arm 57 returns toward its original position under the influence of coil spring 87 and delayed by the time delay mechanism in housing 92 which acts through the time delay pawl lever 100 on timer arm 57, a device such as roller 118 engages the end of the U-shaped extension 117 of the principal latch 113 and pushes the latch 113 back far enough so that the latching detent 112 moves out from under the main latching roller 77 permitting the reclosing spring 512 to drive the plunger 20 and the operating arm 70 down to effect reengagement of contacts 20A, 21. See Figure 21.

Accordingly, it is the return movement of the timing arm 57 which disengages latch 113 from the main latching roller 77 and the time delay which operates on the timer arm 57 determining the degree to which reclosure will be delayed.

The timing mechanism may, therefore, be adjusted to any desired speed and this adjusted speed will be effective to control the return movement of the timing arm 57, which in turn will control the unlatching of the operating arm 70 and the plunger 20.

After the completion of the clockwise rotation of timer arm 57 the curved extension 105 of the reclosing time delay pawl lever 100 moves against the pin 106 to move the pawl tooth 104 out of engagement with the teeth 107 or 107*a* of the time delay ratchet as the case may be (Figure 10).

At this time, the timing mechanism which was wound up by the rotation of ratchet 102 by timer arm 57 in a clockwise direction with respect to Figures 1, 10 and 16 to 23 will now be free to rotate the time delay ratchet 102 and its shaft 110 back to the original or neutral position.

This return movement of the timer shaft 110 and the time delay ratchet 102 will, however, be under the control of the timing mechanism. The time for the return of the time delay ratchet 102 will not necessarily be the same as was required for the original movement. In the first place, the spring 87 which causes the forward movement and the spring in the timer hereinafter described which causes the return movement are of different strengths and, in addition, the return movement is always at the same rate, which is the slowest speed of operation of the timer. On the other hand, the forward movement, which consists of two parts, is at a slow rate for the first portion of its travel. This rate is not necessarily the same as under the return portion since a much heavier spring is operated. In addition, the second portion of travel in the forward direction is under the influence of the heavier spring and at a variable rate of operation depending on the magnitude of the short circuit current as hereinafter described.

If this return movement is completed before the next opening operation, then the next opening operation occurs as if it were the first opening operation of a series and the first and subsequent reclosure will occur as if it were the first of a series.

If, however, this return movement has not been completed before the next opening operation, then on the next closing operation, pawl tooth 104 will engage teeth 107 of the time delay ratchet 102 at a position angularly displaced from the first engagement. The main latch roller 77 will be engaged and held by the latch 113 and the timer arm 57 will again descend under the control, however, of the timing mechanism in housing 92 translated to the timer arm through the timer shaft 110, ratchet 102, and lever 100.

In summary, if the opening of the circuit breaker occurs before the timing mechanism in housing 92 has had an opportunity to begin to return the ratchet 102 and shaft 110 back toward the initial position, then the return of the timing arm 57 under the control of the time delay mechanism will add cumulative angular rotation to ratchet 102 and shaft 110.

The time delay mechanism is adjustable as to the speed of operation by adjustment of stop 315 (Figure 8) in slot 316 by clamping screw 320 as described below in connection with the specific description of the timing mechanism (Figures 8 and 9) in order to manually adjust the mechanism for faster or slower reclosing as conditions may require.

It is essential in the operation of the novel circuit recloser that the contacts be locked open after a predetermined number of reclosing operations.

Thus, in the event the initial cause for opening of the contacts was some transient fault in the line, the recloser may close and remain closed. An example is the case of some accidentally maintained arcing over at an insulator on the line owing to an unusual transient condition, in which case momentary interruption of current occasioned by one opening and reclosure of the contacts will result in extinguishment of the arc which will not then ordinarily reignite owing to the fact that the ionized gases would normally be blown away or otherwise cooled. This will also be the case if wires have accidentally swung together in a high wind.

Moreover, if some relatively high resistance member has caused the fault, the first or second reclosure of the automatic recloser may serve to burn away the cause of the fault and the automatic recloser contacts should then remain closed to maintain the circuit after the fault has been burned away.

If, however, the opening of the contacts resulted from a true short circuit condition which will not be cleared by repeated openings and closings of the automatic recloser, it then becomes essential to lock the automatic recloser open. This is the principal reason for making the angular movements of the time delay ratchet 102 and the timer shaft 110 cumulative on rapidly repeated reclosures.

After a predetermined number of such reclosures as after the second or third reclosure, this cumulative rotation of the reclosing time delay ratchet 102 and the timer shaft 110 may be utilized to bring a lock-out mechanism into operation.

The lock-out mechanism comprises a lock-out ratchet 120 on the timer shaft 110 coaxial with but spaced from the reclosing time delay ratchet 102 and a lock-out pawl lever 121 having a pawl tooth 122 and connected at its opposite end by pin 123 to the principal latch 113.

A coil spring 125 biases the lock-out pawl lever 121 upwardly so that the pawl tooth 122 bears against the surface of the lock-out ratchet 120. The lock-out ratchet 120, as is seen in Figures 12 and 13, is smooth at 126 over a substantial portion of its surface and is provided with teeth 127 over another portion of its surface.

In the original condition of the elements, after a first opening, the pawl tooth 122 engages the smooth section 126 of the surface of the lock-out ratchet 120 whenever the latch 113 is in latching engagement with the roller 77.

After a repeated number of reclosures, however, resulting in cumulative rotation of the timer shaft 110, time delay ratchet 102 and lock-out ratchet 120, the teeth 127 of the lock-out ratchet 120 move into position to be engaged by the pawl tooth 122 on the next opening operation when the latch 113 next moves to a position where it receives and holds the latch 77.

When on an opening operation the latch 113 engages the roller 77 to lock the operating arm 70 and plunger 20 in the up position and when the pawl tooth 122 engages the teeth 127 of the lock-out ratchet 120, remembering that the ratchets 102 and 120 are rotated in a clockwise direction with respect to Figures 10 and 12 as the timer arm descends, the teeth 127 are so curved that they will be locked by the pawl tooth 122 for such clockwise rotation and the pawl tooth 122 on the lock-out pawl lever 121 will prevent such further rotation by the timer shaft 110 and ratchets 102 and 120.

Hence, the timer arm 57 and its pawl lever 100 cannot now descend and the automatic recloser mechanism is now locked out, as shown in Figure 23. This is true since, as pointed out above, it is the descent of the timer arm that is necessary to push the principal latch 113 away from the latching roller 77; and the timer arm cannot now descend.

The lock-out ratchet 120, as hereinafter described, may be made angularly adjustable about the shaft 110 so that the angular position of shaft 110 at which the teeth 127 move into conjunction with the pawl tooth 122 may be determined or set in accordance with the number of reclosures to be had before the lock-out position is reached.

The interlock arrangement definitely does not permit lockout with the main contacts closed. Pin 121A holds lockout pawl 122 away from lockout ratchet 120.

The dashpot unit 130 pivotally mounted on pin 131 and connected to pin 119 of timer arm 57 may provide a time delay on the first reclosure of about thirty cycles rather than the six cycles which may be obtained without the dashpot unit. The reason that the device would operate so fast (six cycles) without the dashpot is that the timer does not function at all on the first reclosure because of the flat spot on the time delay ratchet 102, as previously described. The dashpot is utilized where it is desired to increase this time delay from six to thirty cycles.

By adjusting stop 330 (Figure 8) by means of screw 332, it is possible to relocate the normal or reset portion of the timer and, therefore, the time delay ratchet 102. If this is done, the flat spot is moved in a counterclockwise direction from Figure 11 to Figure 10 and then the detent 104 engages with a tooth and thus provides the full five seconds delay on the first reclosure due to the influence of the timer.

When the contacts 20A, 21 open, on the lifting of the plunger and operating arm 70, then as stated hereinbefore, the control coil 12 is de-energized and spring 26 returns the control switch 16 and the control armature 25 back to their original positions with the control unit returning from the position of Figure 14 back to the position of Figure 15. Owing to the fact that the end 95 of the timer arm 57 is raised, the forward end 56 of the timer arm 57 is lowered and thus it moves away from the pick-up calibrating screw 54.

Consequently, coil spring 52 may now drive the opening latch 50 to a position where its detent 60 locks under the roller 61 of toggle 62—65—64. The latching detent 60, owing to the fact that the pick-up calibrating screw 54 at this point has nothing to rest on because of the lowering of end 56 of the timer arm 57, moves sufficiently under the roller 61 so that it absolutely locks the roller 61 and so that the roller 61 cannot push the opening latch 50 out for a tripping operation.

Energization of control coil 12 after closing of contacts 21—22 by descent of plunger 20 after release of latch roller 77 cannot now pull down the armature 25 to reopen the control switch 16 until the timer arm 57 completes its full return to its original position.

At this time, thereby permitting the reopening time delay hereinafter described to be effective, the end 56 of the timer arm 57 lifts the pick-up calibrating screw 54 to rotate lug 53, pin 51, and latch 50 back to the calibrated position at which the control coil, if properly energized, will pull down the armature 25 with sufficient force to cause the roller 61 to push the latch 50 aside.

As previously pointed out, after the timer arm 57 in its return movement under the control of the time delay ratchet 102 causes the latch 113 to release the main latch roller 77, the closing spring hereinafter described closes contacts 21 and 22 to re-establish the flow of current through the automatic recloser.

At this time, the switch 16 has been closed establishing a by-pass for the operating coil 24 and, therefore, the contacts remain closed. This reclosing of the circuit breakers occurs before the end 56 of the timer arm 57 has reached the pick-up calibrating screw 54.

Accordingly, the latch 50 and its detent are so located under the roller 61 at this point that the control coil 12 cannot pull down the armature 25 to open control switch 61.

With the latch 50, therefore, locking the roller 61, the circuit breaker cannot at this time trip after the first reclosing operation even though a fault current may exist which would normally have energized coil 12 sufficiently to attract the armature 25 and open the switch 16. Such attraction of the armature 25 to open the switch 16 cannot occur until the end 56 of the timer arm 57 lifts the pick-up calibrating screw 54 to rotate the latch 50 to a position where the roller 61 may push it aside to permit collapse of toggle 62—65—64 and thereby permit the attraction of the armature 25 and opening of switch 16.

The timer arm 57 completes its movement to a point where it lifts up the pick-up calibrating screw 54 after a time delay, which varies inversely with the magnitude of the short circuit current. That is, for relatively light over-load currents, the time delay may be as much as several seconds, whereas for heavy short circuit currents, the time delay may be very short, for example, .25 second.

From the above, it will now be clear that the present invention provides time delay for each reclosing operation and for each opening operation following the first instantaneous opening operation.

The time delay is adjustably variable for coordination with fuses and relay controlled breakers or other reclosers, any or all of which may be in series in the circuit.

Both time delays are achieved with the same timing mechanism and with individual latches.

Inasmuch as reclosing is by spring operation, a first latch 113 locks the contacts in disengaged position. The time delay after a predetermined interval releases this first latch to permit fast spring reclosure of the contacts.

Since reopening is by magnet operation, a second latch 50 locks the armature of the control magnet which in turn controls the energizing circuit of the operating magnet. The time delay after a predetermined interval releases this second latch to effect energization of the operating magnet, resulting in fast magnet opening of the contacts.

Although the latter latch is on the armature of the control magnet, which is preferable because the toggle 62—65—64 permits a light latch 60 to lock against a strong pull, the net effect is to lock plunger 20 against movement. Accordingly, the latch can be located anywhere in the mechanical or electrical system which controls movement of plunger 20 including a latch on plunger 20, it being understood that release of the latch would be controlled by the time delay mechanism.

Both the reclosing and reopening time delays are provided to automatically give the circuit time to correct the fault conditions if they can be corrected.

Under short circuit conditions, however, it becomes desirable to hasten the operation of the timer arm 57 from the point where reclosing occurs to the point where it engages the pick-up calibrating screw 54 to permit a tripping operation to occur again.

For this purpose, the additional armature 28 is an inverse time delay armature restrained by its composite spring 32 but which when attracted will operate the fork 31 to adjust the timer adjustment arm 135 for more rapid operation of the timer 92, for coordination with fuses, relay controlled breakers or other reclosers.

The shaft 29 which carries the inverse time delay armature and the adjusting fork 31 carries at its outer end the spring bracket 137 which in turn carries the four or sufficient number of leaf springs 138, 139, 140, 141 comprising the composite spring 32. These springs extend parallel to each other and in surface to surface engagement beneath the angle stop bracket 143 carrying the adjustable stops 144, 145, 146, 147.

Stop 144 is arranged so that it will only engage leaf spring 138. Thus, on relatively low current values attracting the armature 28, leaf spring 138 engaging against stop 144 will halt the armature. On higher current values, leaf springs 138 and 139 engaging stops 144 and 145 will halt the armature. On still higher current values leaf springs 138, 139, and 140 engaging stops 144, 145 and 146 will halt the armature, and in so doing regulate the interval of time suitable for coordination with other devices.

On further increased current values, all the leaf springs 138 to 141 engaging the adjustable stops 144, 145, 146 and 147 will halt the armature 28. On short circuit currents, all of the springs will give to permit full attraction of the armature 28.

The stop positions after they have been set may be adjusted by making the angle bracket 143 rotatable on the pin 149 by securing to the opposite end an adjustment lever 150 movable to three positions, 151, 152, 153, at which it may be engaged.

Figures 3, 4, 5:
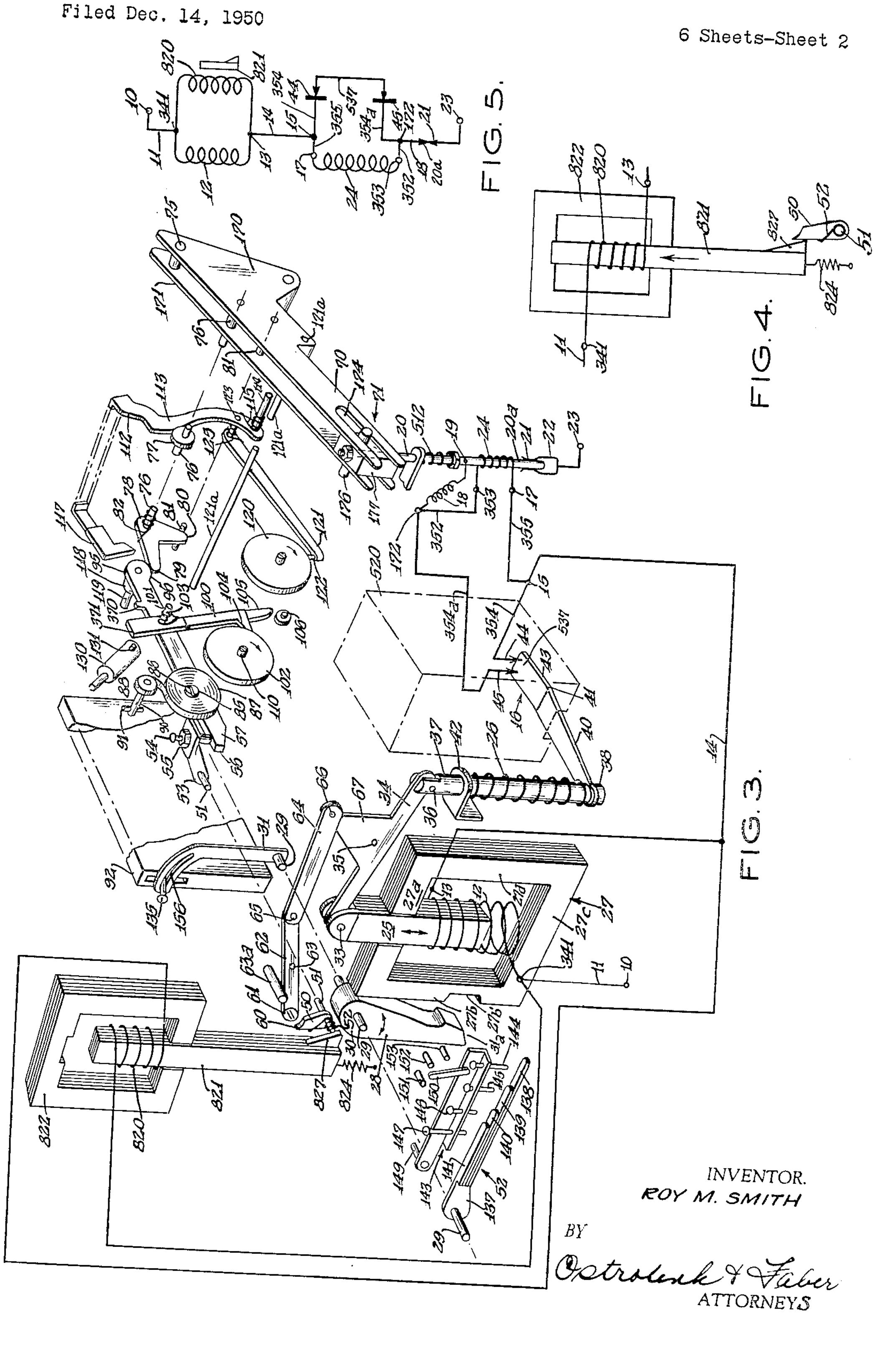
Figure 3 is a schematic view of an automatic recloser incorporating a modified embodiment of the auxiliary relay in normal operating position.
Figure 4 is a fragmentary view of Figure 3 showing the auxiliary relay in lock closed position to restrain movement of the toggle linkage following the first reclosing.
Figure 5 is a circuit diagram of the operation of Figures 3 and 4 and Figures 6 and 7.

As the inverse time armature 28 is pulled inwardly toward the magnet 27, it rotates the adjustment fork 31 in the opposite direction as will be obvious from an inspection of Figure 3, and the curved slot 156 of the adjustment fork 31 receiving the timer adjustment arm 135 will move the timer adjustment arm 135 downwardly.

The timing mechanism in housing 92 is so arranged that as the time adjustment arm 135 is moved downwardly, the ratchets 102, 120 and timer shaft 110 may rotate more freely and when it is moved down all the way, the ratchets 102, 120 and the timer shaft 110 rotate substantially free of any time delay.

Thus, if after the contacts reclose, normal current prevails, the timing arm 57 will continue to complete its movement under the time delay afforded by mechanical timer controlled ratchet 102 as determined by the full time delay available in the timing mechanism in housing 92; and on completion of its movement, the timing arm 57 will lift the pick-up calibrating screw 54 to unlock armature 25 in the manner previously described, thus making it again instantaneous on subsequent over-current.

If, however, an overcurrent condition still exists, the inverse time armature 28 will be attracted to an angular position as determined by the resistance offered by the composite spring 32, the said angular position being a function of the degree of overcurrent.

This attraction will result in rotation of the adjustment fork 31 so that its slot 156 will pull down the timer adjustment arm 135 also to a degree which is a function of the overcurrent condition.

The ratchet 102 and the timer shaft 110 will then rotate more rapidly under the influence of coil spring 87 of timer arm 57 to permit more rapid return of the timer arm 57 to a position where its end 56 lifts the calibrating screw 54 to unlock the control relay 12.

Under high magnitude short circuit conditions, the inverse time delay armature 28 will be attracted to its full extent and the adjustment fork 31 will be rotated to pull down the timer adjustment arm 135 to its full extent to substantially remove the time delay from the timer arm so that the timer arm may move almost instantaneously from the position where it has permitted reclosure to occur to a position where it lifts the pick-up calibrating screw 54, thereby unlocking the control relay armature 25 to permit it to operate once more to cause the automatic recloser to trip open.

Thus, the inverse time delay for the opening of the automatic recloser is controlled by the timing mechanism in housing 92 in that the movement of the timer arm between the position where it has permitted reclosure to occur and the position where it unlocks the relay armature 25 by lifting the calibrating screw 54 is under the control of the same time delay mechanism as controls the reclosing time delay.

As previously pointed out, however, the reclosing time delay operates through one, two, or three or more cycles to a lock-out position by depending on cumulative rotation of shaft 110 carrying ratchets 102 and 120 in the same direction.

The inverse time armature 28, adjustment fork 31 and timer adjustment arm 135 simply operate to permit more rapid movement of the timer shaft 110 in the same direction. The timer arm still operates the time delay mechanism through its full cycle for any reclosing operation, except that the last portion of the cycle after reclosing has occurred and before unlocking of the relay armature 25 may be adjusted as to time to occur more or less rapidly depending on the intensity of the overcurrent condition. Greater choice of coordination is thereby provided.

Consequently, this variation or adjustment of the time delay mechanism does not interfere with the cumulative angular rotation of timer shaft 110 which is measured to determine the number of reclosings which will occur in a single series before a lock-out is reached.

Thus, the novel automatic recloser will operate so that the first opening operation is not subject to a time delay. The first reclosing operation may or may not, depending on the adjustments, be subject to a time delay.

The adjusting fork 31 is always engaged with the timer adjustment arm 135. If the timer adjustment arm 135 is not locked in position, then the second opening operation is subject to an inverse time delay due to the action of armature 28. If the timer adjustment arm 135 is locked in position by the insertion of tip 321 of adjusting screw 320 (Figure 9) in the slot 322 of timer adjustment arm 135, the second opening operation will be at a constant time delay irrespective of the magnitude of short circuit current since the armature 28 and adjusting fork 31 (Figure 1) cannot cause any movement of the timer adjustment arm.

The second and subsequent reclosing operations are subject to time delay and subsequent reopenings are subject to the same time delay which may have inverse characteristics as the second opening operation.

After the lock-out position previously described in connection with Figure 1 is reached, it becomes necessary to release the parts of the automatic circuit recloser so that they may be placed in circuit once more after appropriate inspection of the line has been made.

While in the foregoing reference has for the most part been made to the schematic disclosures of Figures 1 and 20 to 27, it will be seen that all of the essential operating elements of Figures 10 to 15 have been described in connection with the description of the schematic members.

Reference has at times been made to these specific figures during the description of the schematic members in order to clarify the description of the schematic members.

The function of the timing mechanism in housing 92 has already been referred to. It is sufficient here to point out once more that it controls the rotation of the timer shaft 110 by the timer arm 57 in one direction to delay the return of the timer arm 57 back to its orginial position.

After reclosure has occurred, the timer mechanism returns the timer shaft 110 and its associated ratchets 102 and 120 back to their original position with a time delay period determined by the relative strength of spring 271 hereinafter described, restoring the timer shaft 110 and its associated elements back to their original position if the automatic recloser remains closed following its reclosure.

The housing 92 for the timing mechanism 260 (Figures 8 and 9) comprises essentially a pair of parallel plates 261 and 262 connected by bolts 263 and nuts 264 and spaced by spacers 265 surrounding the bolts 263 and captured between the plates 261 and 262.

The main operating shaft 270 of the timing mechanism 260 rotates in appropriate bearings in plates 261, 262 extending transversely thereto.

A main spring 271 located outside of the plate 262 is connected at one end to the stationary bolt 272 carried by plate 262 and at the other end to the main operating shaft 270. A guide plate 273 carried by the main operating shaft 270 confines the turns of the main spring 271. The portion of the main operating shaft 270 extending through plate 261 carries the connecting pin 275 extending through the hexagonal member 276 mounted on the shaft 270 and through the registering openings in the hexagonal member 276 and the shaft 270 so that rotation of the main operating shaft 270 will result in angular movement of the main operating pin 275 and vice versa.

Gear 280 on the main operating shaft 270 is connected to pinion 281 on the arbor 282 carried between plates 261 and 262. Gear 283 on the arbor 282 is connected to pinion 284 on arbor 285 also carried between plates 261 and 262. Gear 286 on arbor 285 is connected to pinion 287 on cam shaft 288. Cam shaft 288 is the escapement shaft of the timing mechanism. Cam shaft 288 carries at its inner end the disc 289 connected by the eccentric transverse cam pin 290 to the disc 291, which in turn is connected to the opposite end of the cam shaft 288*a*.

As the cam shaft 288, 288a is rotated by the gear train 280—281—283—284—286—287, the cam pin 290 describes a circle at a radius from the main axis of the cam shaft 288, 288a. The escapement lever 295 is provided at its upper end with an escapement pin 296 registering in the escapement slot 297 of the escapement wheel 298.

The escapement wheel 298 is mounted on arbor 299 which is rotatable in appropriate bearings between plates 261 and 262. The fulcrum of escapement lever 295 is the pin 300 carried by the timer adjusting arm 135. The lower end of the escapement lever 295 is provided with a flaring slot 305 wider toward its lower end at 306 and narrow at 307 at its upper end, the axis of the slot 305 extending along a line through the fulcrum 300 and the escapement pin 296.

Slot 305 surrounds the cam pin 290. As the main operating shaft 270 of the timer is rotating in one direction, it winds up the main spring 271. At the same time, through the gear train 280—281—283—284—286—287, it rotates the cam shaft 288 and the cam pin 290. With the cam pin 290 resting in the narrow portion 307 of the flaring slot 305, the escapement lever 295 is rotated back and forth around the fulcrum 300.

The escapement pin 296 of the escapement lever 295 entering the escapement slot 297 of the escapement wheel 298 causes the escapement wheel 298 to oscillate back and forth.

The time delay thus obtained is a function of the inertia of the escapement wheel 298 and the escapement lever 295 which, owing to the eccentric movement of the cam pin 290, must move in one direction, come to rest, move in an opposite direction, come to rest once more, and repeat this operation continuously as the main operating shaft 270 of the timing mechanism is rotated.

The inertia of these elements thus provides the time delay. Similarly, when the exterior rotative force on the main operating shaft 270 of the timing mechanism is released, the main spring 271 rotates the elements in an opposite direction to reset the operating shaft 270 back to its original position, being delayed, however, by the escapement lever 295 and the escapement wheel 298, the inertia of which owing to constant change of direction of movement must be overcome at each change of direction of movement.

It will be obvious that the longer the period of each oscillation of escapement lever 295 and escapement wheel 298, the greater the time delay and the shorter the period of oscillation, the smaller the time delay.

For this purpose, the fulcrum 300 is made shiftable vertically. With the fulcrum 300 in the lower position as shown in Figures 8 and 9, full time delay is achieved.

As the fulcrum 300 is raised, the flared portion 306 of the slot 305 moves into registery with the cam pin 290 so that the cam pin 290 oscillates the lever 295 only at the right and left extreme position, its rotation thereby oscillating it through a shorter period. This period descreases as the flared portion 306 of the slot 350 which registers with the cam pin 290 is widened by raising of the fulcrum 300 of the escapement lever 295.

In addition to the decreased period of oscillation, the power ratio of escapement pin 296 with respect to escapement wheel 298 is increased since as the fulcrum 300 of the escapement lever 295 is raised, the escapement pin 296 rises in slot 297 of the escapement wheel to an increased distance away from the pivot 299 of the escapement wheel.

Consequently, the net inertia of the escapement wheel 298 is decreased or rather the net effect of inertia owing to the increase in the power ratio above referred to is decreased.

When the fulcrum 300 is raised to a point where the full flared portion 306 of the flaring slot 305 registers with the cam pin 290, the cam pin 290 does not engage the escapement lever at all during its rotation and operating shaft 270 may rotate even in response to external force or in response to its spring 271 free of the time delay effected by the escapement lever 295 and escapement wheel 298.

To accomplish the shift in fulcrum 300 which varies the time delay afforded by the timing mechanism 260, the timer adjustment arm 135 which carries the fulcrum 300 is pivotally mounted on the cross pin 310 carried between plates 261 and 262. A coil spring 311 biases the end of the timer adjustment arm which carries the fulcrum 300 downwardly. The outer end of timer adjustment arm 135 has the reduced diameter section 312 which receives the slot 156 of the timer adjustment fork 31.

As the timer adjustment fork 31 operates in response to rotation of armature 28 in a manner previously described to move the end 312 of the timer adjustment arm 135 down, the fulcrum 300 of the escapement lever 295 is raised to decrease the time delay afforded by the timing mechanism 260.

If timer adjustment fork 31 is not rotated to pull down the timer adjustment arm 135, then the condition shown in Figures 8 and 9 prevails, in which full time delay is achieved.

An adjustable stop member 315 riding in slot 316 is provided against which the inner end 317 may rest to predetermine the maximum time delay. The higher the adjustable stop 315 is raised, the shorter the maximum time delay period and, therefore, the faster the reclosing operation.

The adjustable stop rides on the inside of plate 262, being guided in slot 316, and a clamping screw 320 extending through the slot 316 into the adjustable stop 315 is provided, the said clamping screw having a wider portion which may engage the portion of the exterior surface of the plate 262 defining the slot 316, the material defining the slot 316 being thus captured between the stop 315 and the clamping screw 320. The clamping screw 320 has an extension 321 passing to the left of the adjustable stop 315 with respect to Figure 9 on which the end 317 of the timer adjustment arm 135 rests.

Thus, the stop 315 and particularly extension 321 of clamping screw 320 determine the maximum time delay of the timing mechanism 260, while fork arm 31 on operating arm 135 in response to the attraction of armature 28 determines the variations from this maximum time delay in the manner previously described.

The screw 320 is readily accessible in order to raise and lower the stop 315 and the extension 321 to adjust the maximum time delay. If, for any reason, it should be desired that no variation in the time delay should occur, irrespective of the degree of energization or attraction of armature 28, then extension 321 of clamping screw 320 may be anchored into slot 322 at the end 317 of timer adjustment arm 135.

This will prevent movement of the timer adjustment arm 135 and of the fulcrum 300 away from its adjusted position.

By this means, therefore, a simplified timing mechanism is provided which will time delay the rotation of operating shaft 270 in one direction by an exterior force and which will correspondingly time delay the return of operating shaft 270 to its original position under the influence of the main spring 271.

As previously described in connection with the schematic view of Figures 1, 10 to 13 and 16 to 23, the timing mechanism controls the rotation of the timer shaft 110 which carries the reclosing time delay ratchet 102 and the lock-out ratchet 120.

The connecting pin 275 carried by the main operating shaft 270 of the timing mechanism shown in Figures 8 and 9 engages a fork carried by the timer shaft 110. The timer shaft 110, as previously described, carries the reclosing time delay ratchet 102, being connected thereto in any suitable manner.

The lock-out ratchet 120 is provided with a plurality of openings 327 and securing screws. The reclosing time delay ratchet 102 is provided with a pair of openings 329. The lock-out ratchet 120 is carried by the reclosing time delay ratchet 102, the angular position of the lock-out ratchet 120 being shiftable with respect to the reclosing time delay ratchet 102 and the timer shaft 110 in order to predetermine the number of reclosures before a lock-out may occur.

This shift of the lock-out ratchet 120 is obtained by lining up appropriate openings 327 in the lock-out ratchet 120 with the openings 329 in the reclosing time delay ratchet 102 and interconnecting the ratchet 120 and 102 by securing screws and appropriate bolts.

As previously pointed out, whether or not the time delay on first reclosure will be obtained is determined by the initial angular position of the reclosing time delay ratchet 102 as shown in Figures 10 and 11.

For this purpose, gear 280 on main operating shaft 270 of the timer is provided with a pin 329 and the wall 262 of the timing mechanism carries the latch 330 pivotally mounted on the lower right-hand bolt 263 with respect to Figure 8. Latch 330 carries the clamping screw 331 passing through a slot in wall 262. The latch member 330 may be adjusted either to the position of Figure 10 or to the position of Figure 11. When it is adjusted so that pin 329 rests in the detent 333, then the angular position of the main operating shaft 270 and the timer shaft 110 is adjusted so that the first reclosure is time delayed.

When it is adjusted so that pin 329 rests against the end 334 of latch 330, then the angular position of the main operating shaft 270, timer shaft 110 and the reclosing time delay latch 102 is adjusted so that the first reclosure is instantaneous.

After the first full reclosure occurs, the engagement of pawl tooth 104 against teeth 107*a* will provide the short time delay between the reclosing of the contacts of the automatic recloser (disengagement of latch roller 77 from latch 113) and the full resetting of the timer arm 57 which permits reopening to occur.

As shown in Figures 12 and 13, the angular position of teeth 127 of the lock-out ratchet 120 determines the number of reclosures after which a lock-out will occur. Where the lockout ratchet 120 is secured to the ratchet 102 so that the teeth 127 are closer to the pawl tooth 122 in a clockwise direction, then the lock-out will occur after relatively fewer reclosures.

When the teeth 127 are adjusted so that they are relatively further from pawl tooth 122, then lock-out will occur after a relatively larger number of reclosures.

If no lock-out at all is desired, then the lock-out ratchet 120 need merely be removed.

In Figure 1 I have shown a preferred form of the armature and auxiliary control coil wherein the control coil 920 energizes the magnet 922 to attract the armature 921.

Auxiliary coil 920 is connected in the manner hereinbefore mentioned. Auxiliary magnet 922 attracts armature 921 downwardly to the release position against the force of spring 924 which is calibrated for a predetermined minimum value so that the circuit breaker will as heretofore described be locked closed on excessive current equal to full interrupting capacity for all openings following the first opening.

In the preferred form of Figure 1, the armature 921 is so arranged that pin 930 thereof comes into contact with the verge 298 of the timing device 92 when attracted by maximum interrupting capacity current and prevents the rotation or oscillation of the verge 298, thereby stalling the timing device and thereby also preventing the rotation of the timer arm 57 to a position where it will cause disengagement of the latch 50.

By this means, therefore, a second reopening of the recloser is prevented as long as the current intensity is such as to energize the auxiliary coil 920 sufficiently to attract its armature 921.

By this means a simplified auxiliary coil 920 is provided in series as noted in Figure 2 with the control coil 12 and so arranged that it will lock the recloser against a second opening as long as the current value remains at or near the maximum interrupting capacity of the recloser. If it should be preferred, the auxiliary coil may be connected in parallel with the control coil 12 as will hereinafter be described in connection with a modified embodiment.

The recloser may thus be rated at its full interrupting capacity with full reliance that if its full interrupting capacity is reached at the time of the second opening of the recloser, the recloser will be locked closed and will thereby permit other elements in the circuit designed to clear the fault to do so.

A modification of the construction and location of the auxiliary relay is noted in Figures 3 and 4 with its alternative electrical connection seen in Figure 5.

During normal operations, the electrical elements of the recloser are connected in series with the power line at terminals 10, 23 which is to be protected by the recloser. This circuit extends from terminal 10, conductor 11, connector 341, through winding 12 of the control magnet, conductors 14, connector 15, contacts 45 and 44 bridged by switch operating member 43, conductor 354A to connector 172 and pigtail 18, terminal 19 to rod 20, contact 20A, 21 to the power line terminal 23.

The control coil 12 has in parallel therewith across the terminals 341 and 13 the auxiliary coil 820 which is arranged to attract the armature 821, the armature 821 being biased by a suitable spring or in any other appropriate manner so that the armature can be attracted only on the occurrence of an overload condition of predetermined minimum intensity—in this case, an overload condition equal to the initial maximum interrupting capacity of the recloser.

As seen in Figure 3, the coil 820 is arranged so that it will energize a magnet 822 to bring the armature 821 against the bias of calibrated spring 824.

The armature 821 is provided with the cam 827 which will bear against the control magnet latch 50 and will lock it in position so that the control magnet cannot thereafter be operated as long as the overcurrent condition of predetermined minimum intensity prevails as noted in Figure 4.

This is so because on a first opening of the recloser, as previously described, the timer arm 57 which will eventually unlock the latch 50 is delayed in its downward movement by the timer 92 until the arm 57 reaches the point where it will shift the latch 50, but the recloser on a reclosing operation will stay in closed circuit position owing to the fact that the control armature 25 is locked against movement.

Locking the latch 50 by the auxiliary armature 821 will also prevent operation of the control magnet 27 and hence will maintain the recloser in closed position during the continuance of the high intensity overload current.

When the high intensity overload diminishes below its predetermined minimum value, then armature 821 will be moved downwardly by spring 824 to release the latch 50 and thereafter the recloser may operate normally once more.

The auxiliary armature 821 has a large mass or is provided with appropriate means to achieve a time lag which is slightly greater than the small inherent time lag of the control magnet armature 25. The appropriate means may consist of a rotatable mass mounted in the path of the armature movement. Thus following initial attraction of the armature 821, it will be decelerated when it transfers a portion of its kinetic energy to the rotatable mass. This feature is not illustrated in the figures but may be used to introduce the required small time lag.

Occurrence of a high intensity overload current will cause armature 25 to move more rapidly than the auxiliary armature 821 as a result of this differential in rate movement. Thus, on the first opening of the recloser, control armature 25 will break toggle linkage 62—65—64 and effect an instantaneous opening of the contacts 20*a* and 21 before extension 827 of auxiliary armature 821 reaches latch cam 50. However, following the first reclosing, the timer mechanism 92 will prevent attraction of armature 25 but will not affect the movement of auxiliary armature 21.

Consequently, the armature 821 will complete its entire movement to the position of Figure 4 before the timer mechanism 92 releases latch cam 50 and armature 25. Hence, the recloser will be held in a closed position during the continuation of a high intensity overload current only after the recloser has made an instantaneous opening and closing operation.

Figures 6, 7:
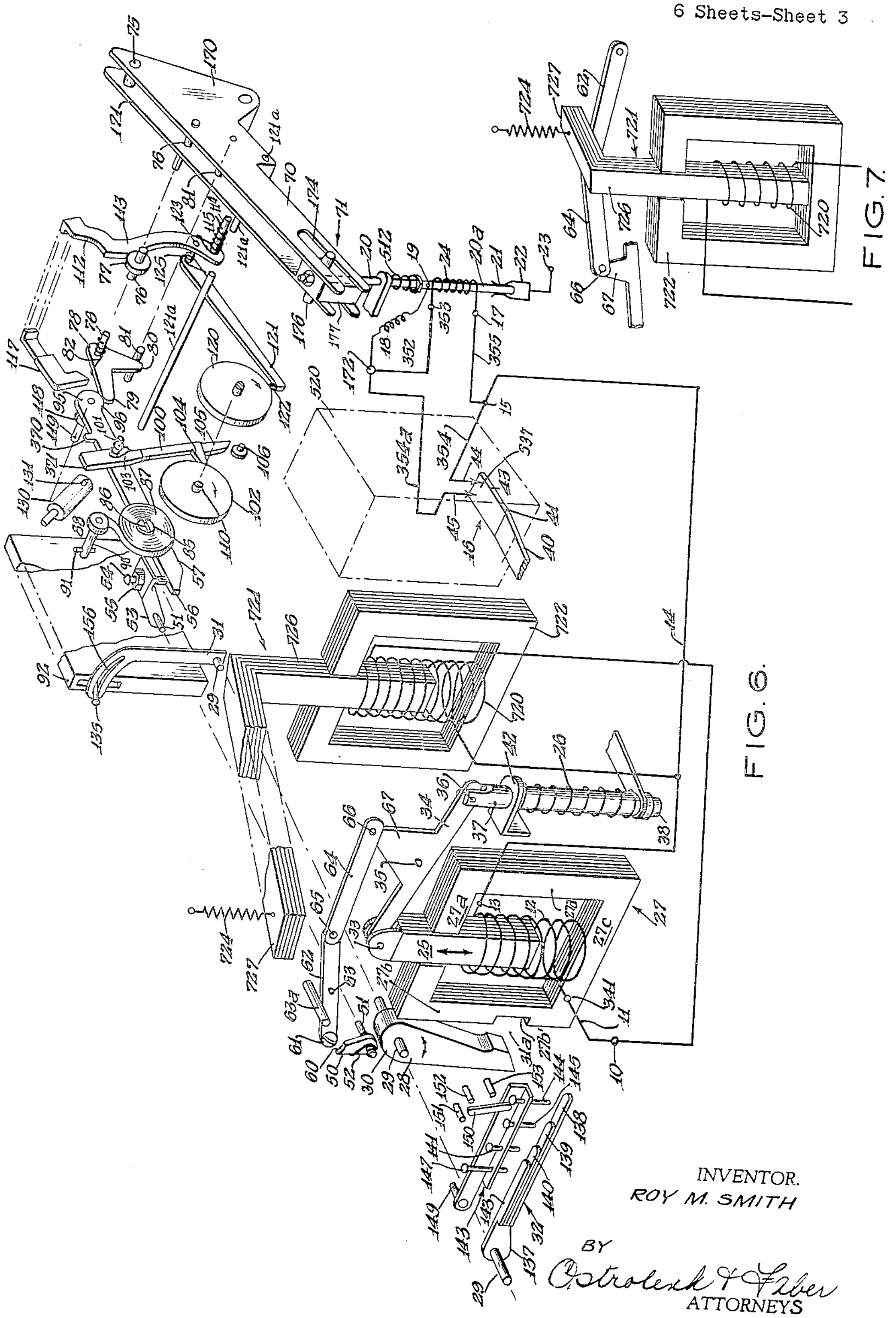
Figure 6 is a schematic view of an automatic recloser incorporating another modified embodiment of the auxiliary relay under normal operating conditions.
Figure 7 is a fragmentary view of Figure 6 showing the auxiliary relay in locked closed position and restraining the toggle linkage movement following a first reclosing operation.

Another modified form of my invention is illustrated in Figures 6 and 7. The auxiliary coil 720 is connected in the same manner as coil 820 of Figure 5. As seen in Figure 6, the coil 720 is arranged so that it will energize a magnet 722 to lower the armature 721 against the upward bias of calibrated spring 724.

The armature 721, as seen in Figures 6 and 7, is made in an L-shaped form comprising two portions 726, 727. The main leg 727 is made of a suitable magnetic material which is surrounded by the auxiliary relay coil 720. The stop latch 727 may be an integral part of the armature 721 or rigidly attached member of suitable strength. The stop latch 727 is provided to bear against toggle link 62—65—64.

As long as an overcurrent condition of predetermined minimum intensity prevails after the first reclosing, the armature 721 of auxiliary relay 722 will be magnetically attracted down against the calibrated spring 721 and cause stop latch 727 to bear against toggle 62—65—64. Thus, there will be two opposing forces.

The control electromagnet 27 will tend to attract armature 25 and break the toggle 62—65—64 while the auxiliary electromagnet 722 attracts its armature 726 which prevents toggle 62—65—64 from breaking. This condition will prevent contact separation due to shunt 43 as hereinbefore described and cause locked closed conditions to prevail during the duration of overcurrent flow of a predetermined minimum intensity.

Due to the force multiplying action of the toggle linkage, the force required from the auxiliary electromagnet 722 to hold the toggle link 62—65—64 in closed position is much smaller than that force exerted by the control armature 25 attempting to break the toggle.

It should be noted that the mass and thus time lag of the auxiliary armature 721 is greater than that of the control armature 25 for the reasons heretofore outlined in connection with the embodiment of Figures 3 and 4.

Thus, auxiliary relay 722 has no effect on the initial instantaneous open and close operation of the recloser. That is when an overcurrent condition exists, armature 25 will attract at a lower value of current than the time lag armature 721 and the contacts 20A and 21 will separate before sufficient movement of armature 25 takes place.

Immediately following the first reclosing, armature 25 is unable to move due to the lock closed action of the latch cam 50 as heretofore described.

If at this time an overcurrent condition of predetermined minimum intensity prevails, armature 721 is free to move downward effecting a lock closed position as noted in Figure 7.

In the foregoing, I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a recloser, a pair of cooperable contacts having engaged and disengaged positions, means biasing said contacts closed, an operating magnet for operating said contacts to open position, a control magnet and an auxiliary control magnet each having an armature having an operated and a non-operated position, a by-pass circuit around said operating magnet controlled by said control magnet armature for controlling the energization of said operating magnet, a first latch for engaging said control magnet armature in its non-operated position to prevent its operating by said control magnet when energized, said auxiliary control magnet armature engaging said first latch when said auxiliary control magnet is energized by a predetermined current value, a second latch for maintaining said contacts in disengaged position and means controlling the release of said second latch to permit re-engagement of said contacts under control of said biasing means.

2. In a recloser, a pair of cooperable contacts having engaged and disengaged positions, means biasing said contacts closed, an operating magnet for operating said contacts to open position, a control magnet and an auxiliary control magnet having an armature having an operated and a non-operated position, a by-pass circuit around said operating magnet controlled by said control magnet armature for controlling the energization of said operating magnet, a first latch for engaging said armature in its non-operated position to prevent its operating by said control magnet when energized, a second latch for maintaining said contacts in disengaged position and a time delay mechanism for controlling the time of release of said second latch to permit re-engagement of said contacts under control of said biasing means and for controlling the time of release of said first latch for controlling the time of operating of said operating magnet for effecting disengagement of said contacts.

3. In a recloser for protecting an electrical circuit, a pair of cooperable contacts having engaged and disengaged positions, biasing means for operating said contacts to closed position, an operating magnet for operating said contacts to open position, an auxiliary contact magnet having an armature, a control magnet having a first armature, having an operated and non-operated position, electrical circuit connections controlled by said control magnet armature for controlling the energization of said operating magnet, a first latch held by said auxiliary control magnet armature for engaging said first armature in its non-operated position to prevent its operation by said control magnet when said magnets are energized by a predetermined current value, a second latch for maintaining said contacts in disengaged position, a time delay mechanism for controlling the time of release of said second latch to permit re-engagement of said contacts under control of said biasing means and for controlling the time of release of said first latch for controlling the time of operation of said operating magnet for effecting disengagement of said contacts, said auxiliary control magnet when energized by a predetermined current value preventing said time delay mechanism from controlling the time of release of said first latch.

4. In a recloser, a control magnet and an auxiliary control magnet, each with an armature having an operated and non-operated position, means for biasing said control armature to its non-operated position, a calibrating means for adjusting the current value response of said control magnet including a latch for engaging said control armature in its non-operated position, said control magnet when energized in response to a predetermined current operating said control armature against the action of said biasing means and said latch, said auxiliary control armature engaging said latch on the first reclosure when said auxiliary control magnet is energized by a predetermined current value.

5. In a recloser, an operating magnet, a control magnet, said operating magnet and control magnet being calibrated to respond to fault current, an armature for said control magnet, an auxiliary control magnet calibrated to be energized by currents of the order of the full interrupting value of said recloser, an armature for said auxiliary control magnet, means for preventing the operation of said control magnet armature when said auxiliary control magnet is energized, a pivoted lever having one end connected to said control magnet armature, a connecting rod connected to the other end of said pivoted lever, a control switch connected to said connecting rod and a pair of contacts bridging said operating magnet opened and held closed by said control switch in accordance with the magnitude of energization of said control magnet and said auxiliary control magnet.

6. In a recloser, a pair of cooperable contacts, a biasing means normally maintaining said contacts in engagement, an operating magnet responsive to fault currents for operating said contacts to disengaged position against the action of said spring, and a latch for latching said contacts in disengaged position, a timing mechanism and a device controlled by said timing mechanism for releasing said latch to permit operation of said contacts to re-engagement under control of said biasing means and means comprising an auxiliary control magnet for preventing energization of said operating magnet at current values above a predetermined value after re-engagement of said cooperable contacts.

7. In a recloser, comprising a pair of cooperable contacts biased in engagement, an operating magnet, a control magnet and an auxiliary control magnet connected in electrical series, said operating magnet being responsive to fault currents for operating said contacts to disengaged position, an electrical by-pass circuit normally closed around said operating circuit, said control magnet opening said electrical by-pass around said operating magnet when said control magnet is energized by a fault current, said auxiliary control magnet operating blocking means to prevent said control magnet from opening said electrical by-pass after the first reclosing when said auxiliary control magnet is energized by a predetermined current value.

8. In a recloser, an operating magnet, a control magnet, an armature for said control magnet having an operating and non-operating position, an auxiliary control magnet, an armature for said auxiliary control magnet having an operating and non-operating position, a pivoted lever having one end connected to said control armature, a connecting rod connected to the other end of said lever, a control switch connected to said connecting rod, said control switch comprising a pair of contacts across said operating magnet and a bridging contact operated by said connecting rod to close and open said contacts in accordance with the operative and non-operative position of said control magnet, a toggle mechanism, one end of said toggle mechanism being connected to said control armature, a latch engaging the other end of said toggle for latching said armature against operation, said control magnet armature normally moving to an operative position in response to a predetermined energization thereof disengaging said toggle from said latch to permit unobstructed operation of said armature, said auxiliary control armature blocking disengagement of said toggle from said latch when in its operative position.

References Cited in the file of this patent

UNITED STATES PATENTS

| | | |
|---|---|---|
| 1,814,826 | Carpenter | July 14, 1931 |
| 2,487,025 | Matthews | Nov. 1, 1949 |